United States Patent
Subramanian et al.

(10) Patent No.: US 11,746,498 B2
(45) Date of Patent: Sep. 5, 2023

(54) SYSTEMS AND METHODS FOR ELECTRONICALLY ASSESSING OPERATOR PERFORMANCE WHEN OPERATING A MACHINE BASED ON MACHINE-RELATED DATA ASSOCIATED WITH THE MACHINE

(71) Applicant: Caterpillar Inc., Peoria, IL (US)

(72) Inventors: Gautham Subramanian, Peoria, IL (US); Bradley K. Bomer, Pekin, IL (US); Shane C. McBride, Denver, CO (US); Allen J. Declerk, Princeton, IL (US)

(73) Assignee: Caterpillar Inc., Peoria, IL (US)

( * ) Notice: Subject to any disclaimer, the term of this patent is extended or adjusted under 35 U.S.C. 154(b) by 344 days.

(21) Appl. No.: 17/105,903

(22) Filed: Nov. 27, 2020

(65) Prior Publication Data
US 2022/0170240 A1 Jun. 2, 2022

(51) Int. Cl.
*E02F 9/20* (2006.01)
*G07C 5/00* (2006.01)
*G07C 5/08* (2006.01)

(52) U.S. Cl.
CPC .......... *E02F 9/2045* (2013.01); *E02F 9/2054* (2013.01); *G07C 5/008* (2013.01); *G07C 5/0808* (2013.01)

(58) Field of Classification Search
CPC ...... E02F 9/2045; E02F 9/2054; G07C 5/008; G07C 5/0808; G06Q 10/0631; G06Q 10/0639; G06Q 10/08; G06Q 50/08; G06Q 50/28; G06Q 50/02
See application file for complete search history.

(56) References Cited

U.S. PATENT DOCUMENTS

| | | | |
|---|---|---|---|
| 7,992,686 B2* | 8/2011 | McCabe | G06Q 10/08 701/50 |
| 8,190,336 B2* | 5/2012 | Verkuilen | E02F 9/265 701/50 |
| 8,355,847 B2 | 1/2013 | Colwell et al. | |
| 8,504,284 B2* | 8/2013 | Brulle-Drews | G01C 21/3469 701/410 |
| 9,165,330 B2* | 10/2015 | Ueda | G06Q 10/0639 |
| 9,868,623 B1* | 1/2018 | Guy | B66F 9/12 |
| 2012/0136524 A1 | 5/2012 | Everett | |
| 2016/0364660 A1* | 12/2016 | Brown | G06Q 10/047 |
| 2017/0286886 A1* | 10/2017 | Halepatali | G06Q 10/06398 |

(Continued)

FOREIGN PATENT DOCUMENTS

| | | |
|---|---|---|
| CN | 106127357 A | 11/2016 |
| JP | 2019200462 A | 11/2019 |
| WO | WO 2016/014966 A2 | 1/2016 |

OTHER PUBLICATIONS

Written Opinion and International Search Report for Int'l. Patent Appln. No. PCT/US2021/060704, dated Mar. 14, 2022 (10 pgs).

*Primary Examiner* — Sizo B Vilakazi (57) ABSTRACT

A system and method for electronically assessing operator performance when operating a working machine adapted to handle or process ground material. The system and method can identify compliance with operating instructions for operating the working machine and/or can uniquely characterize functions of the working machine based on external factors.

16 Claims, 4 Drawing Sheets

(56) References Cited

U.S. PATENT DOCUMENTS

| | | | |
|---|---|---|---|
| 2017/0314232 A1* | 11/2017 | Chi | G06F 3/0484 |
| 2018/0018880 A1* | 1/2018 | Smith | G01C 21/3407 |
| 2019/0265051 A1* | 8/2019 | Lewis | G01C 21/3667 |
| 2020/0110417 A1* | 4/2020 | Utter | E02F 9/2045 |
| 2021/0334720 A1* | 10/2021 | Brockhurst | G06Q 10/06314 |

* cited by examiner

SYSTEMS AND METHODS FOR ELECTRONICALLY ASSESSING OPERATOR PERFORMANCE WHEN OPERATING A MACHINE BASED ON MACHINE-RELATED DATA ASSOCIATED WITH THE MACHINE

TECHNICAL FIELD

The present disclosure relates generally to systems and methods for electronically assessing operator performance when operating a working vehicle adapted to handle or process ground material, such as a haul truck, a loader, a tractor (e.g., bulldozer), a vibratory compactor, etc.

BACKGROUND

Problems may exist in conventional tracking of hauling processes (including loading, hauling, and offloading or dumping). For instance, driver efficiency or productivity in terms of routing may not be accurately identified and assessed.

U.S. Pat. No. 9,165,330 ("the '330 patent") describes a management system of a mining machine whereby a management device collects operation information about the dump truck via a management-side wireless communication device. The '330 patent describes distinguishing and identifying the route along which a mining machine travels in a mine, performing productivity evaluation of the mining machine, and providing driver education.

Additionally, present methods of machine control may not adequately characterize machine functions based on either the composition of the work surface or the respective work cycle task (e.g., segment) being performed by the machine. As a result, it can be difficult to diagnose machine performance and identify areas where efficiency improvements are needed.

U.S. Pat. No. 8,190,336 ("the '336 patent") describes a receiving data at a processing device and determining a signature based on the received data for each parameter. According to the '336 patent, each parameter signature may be indicative of a current state of the associated parameter. For instance, the '336 patent describes that the comparisons between the parameter signatures and the reference signatures may be used to determine which operating modes may be indicated by each parameter signature.

SUMMARY OF THE DISCLOSURE

In one aspect, the present disclosure describes or implements a method for electronically assessing operator performance when operating ground material moving machines. The method can comprise providing, to a routing module, work project information for a work project, the work project information including at least worksite data regarding one or more worksites associated with the work project and ground material moving machine data regarding one or more ground material moving machines identified to perform the work project; determining, using a work project management module, for each of the one or more ground material moving machines, route deviation for the work project based on comparison of actual route information regarding an actual route taken by the ground material moving machine with instructed route information for the work project produced by the routing module prior to commencement of the actual route taken by the ground material moving machine; and electronically outputting, by the work project management module, feedback regarding the determined route deviation.

In another aspect, the present disclosure can implement or provide a system for managing work projects for haul trucks. The system can comprise: a work project management module of a first entity, including memory and processing circuitry, configured to receive and process work project information for a work project to be performed by one or more haul trucks of a second entity different from the first entity, the work project information including worksite data regarding one or more worksites associated with the work project, haul truck data regarding the one or more haul trucks, and operator data regarding one or more operators for the one or more haul trucks; and a routing module of a third entity different from the first and second entities, which is accessible by the second entity, configured to receive the work project information from the work project module, determine job-specific route information for the work project for each of the one or more haul trucks based on the work project information, and provide the determined job-specific route information in the context of a map to each of the one or more haul trucks for display on a display device in the haul truck. The work project management module can be configured to, for each of the one or more haul trucks, receive actual route information regarding an actual route taken for the work project by the haul truck, compare the actual route information to the job-specific route information, and determine route deviation, if any, regarding the comparison. The work project management module can be configured to electronically output feedback to the second entity regarding the determined route deviation.

In yet another aspect a non-transitory computer-readable storage medium storing computer-readable instructions that, when executed by one or more computers, cause the one or more computers to perform a method can be provided or implemented. The method can comprise acquiring, in real time, machine data from one or more machine sensors of a ground material moving machine at a worksite; acquiring, in real time, ground surface operational parameters of the ground material moving machine at the worksite; comparing the acquired machine data and ground surface operational parameters with historical data regarding operation of the ground material moving machine at the worksite; dynamically changing an operating point for the ground material operating machine based on the characterization; and characterizing one or more functions of the ground material moving machine based on the changed operating point.

Other features and aspects of this disclosure will be apparent from the following description and the accompanying drawings.

DETAILED DESCRIPTION

The present disclosure relates generally to systems and methods for electronically assessing operator performance when operating a working vehicle adapted to handle or process ground material based on machine-related data associated with the machine. Such machines can include a haul truck, a loader, a tractor (e.g., a bulldozer), a vibratory compactor, etc. As used herein, ground material can mean earth- or earthen-based material or other surface materials, such as asphalt, gravel, debris, etc.

Figure 1:
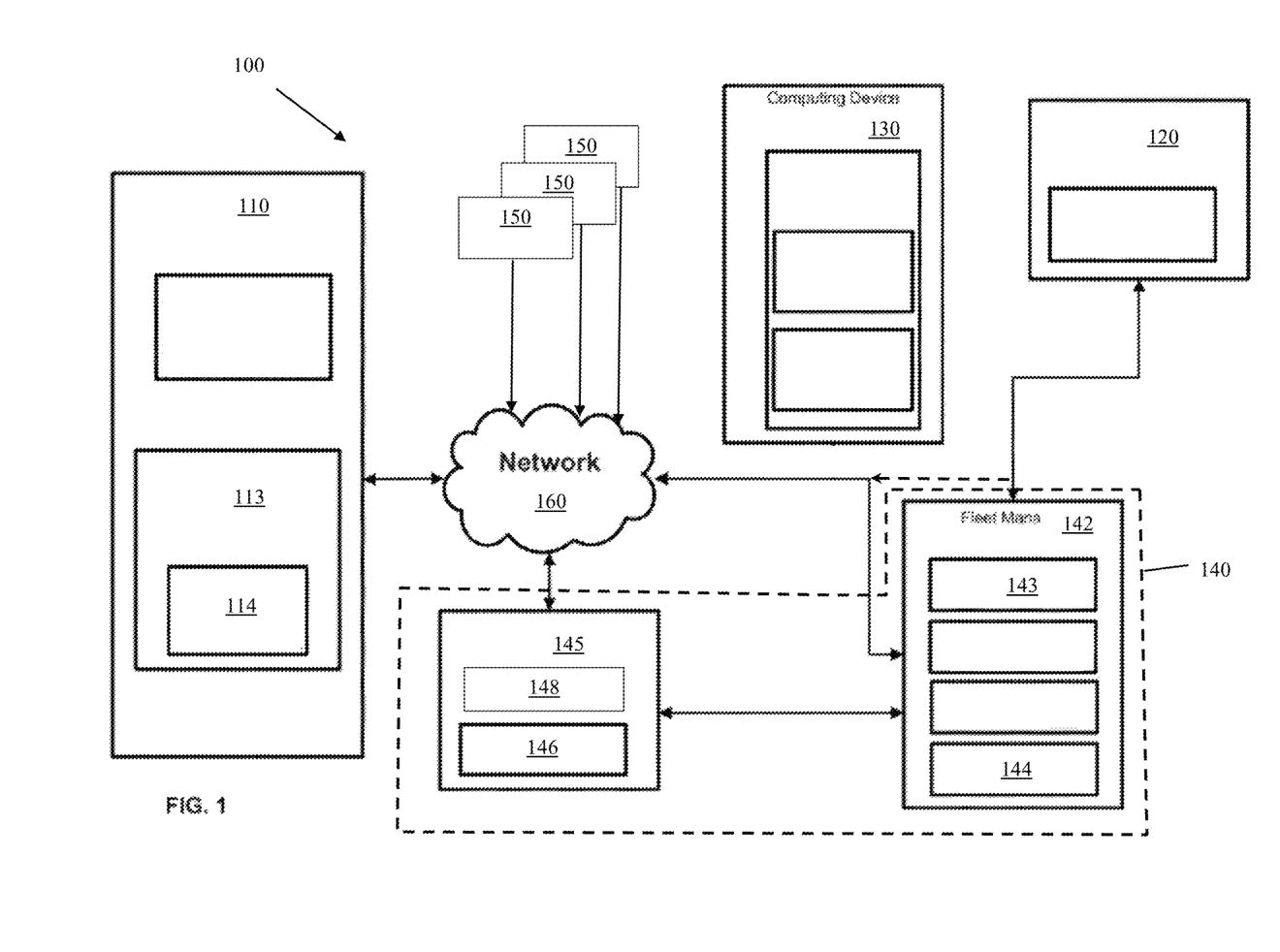
FIG. 1 illustrates a system for managing activity-related data regarding machines at a worksite according to one or more embodiments of the disclosed subject matter.

FIG. 1 is a block diagram of a system 100 according to one or more embodiments of the disclosed subject matter. Embodiments of the disclosed subject matter can be directed to or involve the system 100 or portions thereof, including select combinations of portions of the system 100. According to one or more embodiments, system 100, or portions thereof, may manage work projects involving one or more worksites.

System 100 can include a work project management system 110, a routing system 120, a back office system 130, and a working machine system 140, the latter of which can include one or more ground material moving machines 145, such as haul trucks, loaders, tractors (e.g., bulldozers), vibratory compactors, etc., including combinations of such ground material moving machines 145. Optionally, system 100 can include or otherwise interact with at least one worksite system 150. In some embodiments some or all of the one or more ground material moving machines 145 may be considered separate from the worksite system(s) 150. Additionally or alternatively, some or all of the one or more ground material moving machines 145 may be considered part of the worksite system(s) 150, for instance, if such ground material moving machine(s) 145 remain at the particular worksite system 150.

Generally, the work project management system 110 may be associated with a first entity, for instance, a contractor (e.g., a general contractor) managing a work project; the working machine system 140 can be associated with a second entity or second entities, for instance, a subcontractor (e.g., a trucking company) subcontracted by the first entity to perform tasks or jobs as part of the work project using the one or more ground material moving machines 145; the routing system 120 can be associated with a third entity, for instance, a commercial routing provider (e.g., commercial routing company providing routing software) that can provide routing guidance (e.g., instructed route information, job-specific route information, estimated timing, etc.) for each of the one or more ground material moving machines 145; and the back office system 130 can be associated with a fourth entity, for instance, a data aggregator that can gather work data, for instance, work project information, that may be used to perform the work project, or portions thereof.

According to one or more embodiments, each worksite system 150 may be associated with respective separate entities (e.g., a pavement producing company, a work project site owner, etc.). Optionally, at least one of the worksite system(s) 150 (e.g., a dump site) may be associated with the first entity. That is, according to one or more embodiments, the work project management system 110 may be provided at one of the worksite systems 150. For instance, a contractor operating the work project management system 110 may be at a dump site for a construction project requiring one or more ground material moving machines 145 to retrieve haul material from another worksite system 150 and bring the haul material to the worksite system 150 for the construction project.

A network 160 can connect some or all of the components of the system 100. According to one or more embodiments, network 160 may be representative of multiple networks. Thus, the network 160 can embody any network (or networks) that provides communication between and/or among components of the system 100, such as computer systems, processors, circuitry, communications interfaces, servers, etc. For instance, the network 160 may be or include a wireless communication network (that implements a corresponding communication protocol), such as a cellular network, a satellite-based network, the Internet, a local area network (LAN), etc.

According to one or more embodiments, the back office system 130 can be communicatively connected to each worksite system 150 via the network 160, for instance. Such connection can be for the back office system 130 to receive worksite data or information from the worksite system(s) 150. Worksite data can include one, some, or all of the following worksite information, per worksite system 150: location information, segmentation information, worksite need or needs, jobs or projects to be performed and/or that have been performed, status information, readiness information, restriction information, timing information, material(s) information, terrain information, etc.

Some or all of the worksite data can pertain to or otherwise be useful or used to perform the work project. Hence, such some or all of the worksite data may be characterized as work project information. As discussed above, some or all of the worksite data may be used to direct the one or more ground material moving machines 145 to perform various tasks or jobs as part of the work project.

The work project management system 110 and the back office system 130 also can be communicatively connected to each other via the network 160. Optionally, such connection may be subscriber-based, meaning that the work project management system 110 can subscribe to gain access to the back office system 130, for instance, so the back office system 130 can provide at least a portion of the work project information to the work project management system 110. The work project management system 110 can thus receive work project information, such as worksite data, from the back office system 130 for one or more work projects.

According to one or more embodiments, the work project management system 110 and the working machine system 140 can be communicatively connected to each other via the network 160, for instance. Optionally, the connection between the working machine system 140 and the work project management system 110 may be subscriber-based, meaning, for instance, that the working machine system 140 can subscribe to gain access to the work project management system 110, and hence the ability to (or be considered to) work on various tasks or jobs as part of the one or more work projects handled or managed by the work project management system 110.

Generally, the work project management system 110, which can include a work project management module comprised of a processor or processing circuitry 113 and memory 114, can receive working machine data or information from the working machine system 140. Such working machine information can include, for instance, numbers, locations, statuses, types, etc. of ground material moving machines 145 available for particular work projects. As a specific example regarding a haul truck as the ground material moving machine 145, the working machine information can include data regarding capacity, height, and/or width of the haul truck. Optionally, the working machine information may also include operator or user data, for instance, actual operators assigned to the specific ground material moving machines 145 or candidate operators for assignment to the specific ground material moving machines 145. Operator data may include name, operator ID, experience, historical data, etc. pertaining to each operator.

Some or all of the work machine information can be sent from a fleet management system 142 of the working machine system 140 to the work project management system 110. Additionally or alternatively, some or all of the work machine information can be sent from the ground material moving machines 145 themselves, either via the fleet management system 142 of the working machine system 140 and/or directly to the work project management system 110 via the network 160, for instance.

Such working machine information can be sent to the work project management system 110 in response to a request from the work project management system 110, wherein the request may include information specific to the particular work project. Alternatively, the working machine information can include one or more ground material moving machines 145 selected by the working machine system 140 based on information specific to the particular work project sent by the work project management system 110. That is, according to one or more embodiments, the working machine system 140 can select particular ground material moving machine(s) 145 for the particular work project indicated by the work project management system 110.

Optionally, the worksite system(s) 150 and the working machine system 140 may be communicatively connected to each other, for instance, via the network 160 (which may encompass a network or networks different from those used for the work project management system 110 to communicate with the worksite system(s) 150). Thus, some or all of the worksite system(s) 150 may send worksite data to the working machine system 140 without going through the work project management system 110.

The routing system 120 can provide access to one or more routing methodologies (e.g., algorithms) to provide routing guidance (e.g., instructed route information, job-specific route information, estimated timing, etc.) for each of the one or more ground material moving machines 145 relative to particular work projects, or portions thereof. Access can be provided to the working machine system 140 and/or the work project management system 110, wherein such access can be local or remote relative to the working machine system 140 and/or the work project management system 110.

That is, in the case where the working machine system 140 has access, the working machine system 140, for instance, using a processor or processing circuitry 143 and memory 144 of the fleet management system 142 thereof, can run or otherwise perform the methodology based on software (e.g., an application) running on the working machine system 140 or remotely at the routing system 120 side. Features used to perform the methodology, such as software and/or hardware, may be referred to as a routing module (or routing modules), and may be provided entirely locally at the working machine system 140 or distributed across the working machine system 140 and the routing system 120.

Additionally or alternatively, a processor or processing circuitry of (e.g., of an electronic control unit (ECU)) or in (e.g., a portable electronic device, such as smart phone of the operator) each ground material moving machine 145 can have access to the routing module (or modules) of the routing system 120. This can mean that the ground material moving machines 145, themselves, can implement the routing module(s) locally/directly or via the fleet management system 142.

Likewise, in the case where the work project management system 110 has access, the work project management system 110, for instance, using a processor or processing circuitry 113 and memory 114 thereof, can run or otherwise perform the methodology based on software (e.g., an application) running on the work project management system 110 or remotely at the routing system 120 side. Features used to perform the methodology, such as software and/or hardware, may be referred to as a routing module (or routing modules), and may be provided entirely locally at the work project management system 110 or distributed across the work project management system 110 and the routing system 120.

In any case, as noted above, the routing module of the routing system 120 can provide routing guidance for the one or more ground material moving machines 145, particularly with respect to paths or routes to take (or not to take) for a particular work project or portion thereof. In this regard, the routing module can be provided with an input (or inputs) that may be specific to a work project, for instance, a work project specified by the work project management system 110. That is, the work project management system 110 can provide as input(s) to the routing module of the routing system 120 work project information for a particular work project. As noted above, work project information can include worksite data from one or more worksite system(s) 150. Work project information may also include working machine information regarding one or more ground material moving machines 145 (e.g., haul truck(s)) identified for the work project. Optionally, operator data for the one or more ground material moving machines 145 may be provided, for instance, included in the working machine information. Hence, the routing module can provide routing guidance for the one or more ground material moving machines 145 based on input(s) specific for the particular work project, such as the working machine information provided by the work project management system 110.

As alluded to above, the work project information may be provided directly to the routing module by the work project management system 110, for instance, where the work project management system 110 has access to the routing module. Alternatively, the work project information may be provided from the work project management system 110 to the routing module via the working machine system 140, for instance, to the fleet management system 142 and/or each ground material moving machine 145, depending upon the distribution of processing for the routing module.

According to one or more embodiments, the input(s) specific to the work project or portion thereof, such as the work project information, can include work project- or job-specific requirements provided by the work project management system 110, for instance. Additionally or alternatively, such work project- or job-specific requirements may be provided by one or more of the worksite system(s) 150 and/or the working machine system 140. Examples of work project- or job-specific requirements include timing, route or path restrictions or requirements, ground material moving machine limitations, etc.

Regarding work project- or job-specific requirements in the form of timing, such requirements may set forth, as examples, a time (or time window) at which one of the ground material moving machines 145 must arrive at a particular worksite system 150, for instance, to receive a load at a specified time when the load is ready or an amount of time (or an amount of time window) in which the ground material moving machine 145 should traverse from one worksite system 150 to another worksite system 150.

Regarding work project- or job-specific requirements in the form of route/path restrictions or requirements, such requirements may set forth, as examples, characteristics of paths or routes available for the one or more ground material moving machines 145 to take (or not take). Such characteristics can include a fastest route (or route segment) or routes to take (or not take) in order to bypass certain features (e.g., rough roads, roads with low bridges, highways, known problematic roads, etc.).

Regarding work project- or job-specific requirements in the form of ground material moving machine limitations, such requirements may set forth, as examples, characteristics of paths or routes available for the one or more ground material moving machines 145 based on characteristics of the ground material moving machines 145 themselves, such as weight restrictions, type of hauling material, road surfaces over which the ground material moving machines 145 are able to traverse, etc.

The routing module of the routing system 120 can thus receive the input(s) and use the input(s) to determine task- or job-specific routing guidance, specific to the work project, for each of the one or more ground material moving machines 145. Route guidance can mean instructed route information, which can include an instructed specific route or directive to take a particular route (optionally including not to take a particular route) for a particular job or task (e.g., route segment) of the work project. Route guidance may also include a timing by which to complete some or all of the specific route or path and/or a timing by which to begin the specific route or path. According to one or more embodiments, the job-specific routing guidance can include a shortest path for the ground material moving machine 145 in terms of time and/or distance to reach a final destination for the work project. Optionally, such path may include multiple path segments.

Ultimately, the routing guidance can be provided to the one or more ground material moving machines 145 either directly or indirectly via the work project management system 110 or the fleet management system 142, for instance, depending upon where the routing module processing occurs.

Figure 2:
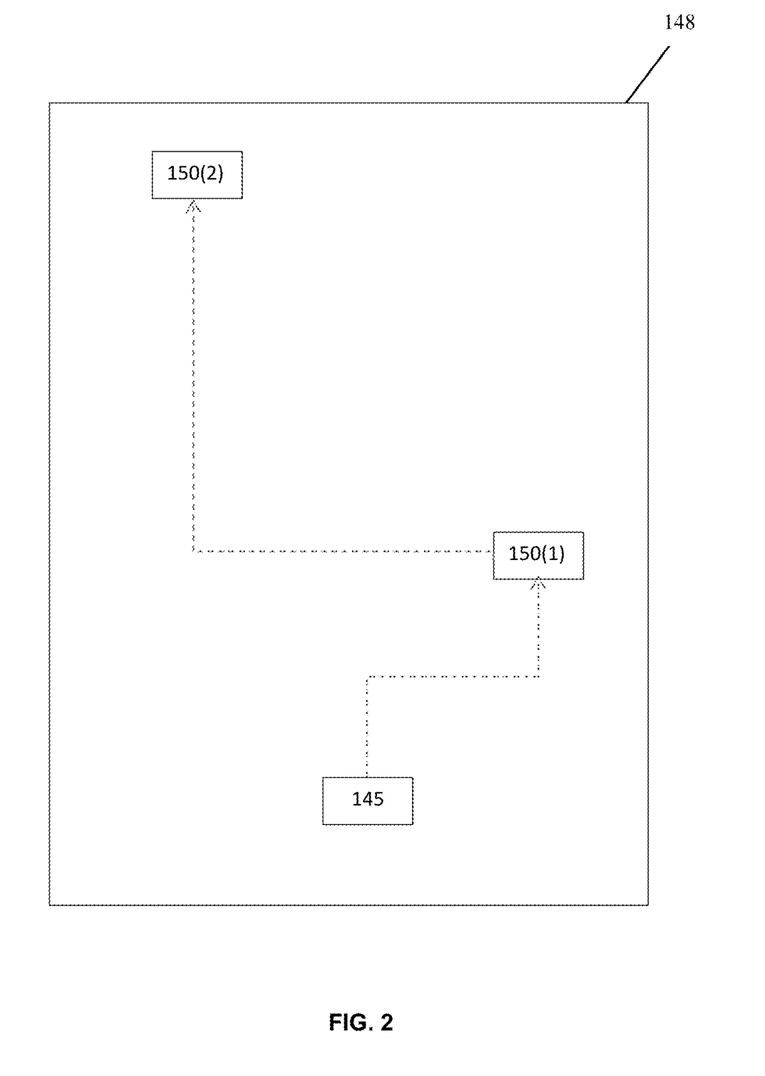
FIG. 2 is a diagram of display device for providing route guidance to a ground material hauling machine according to embodiments of the disclosed subject matter.

FIG. 2 shows an example of route guidance provided to the one or more ground material moving machines 145. Such routing guidance, which can be provided to the one or more ground material moving machines 145 prior to commencement of ground material moving machine(s) 145 starting a particular job, may be provided on a display 148 of or in the ground material moving machine 145. The display 148, therefore, may be an operator interface of the ground material moving machine 145 and/or a mobile electronic device merely residing in the ground material moving machine 145, such as a mobile phone or the like. Such route guidance can be provided in real-time, for instance, and can be updated as the ground material moving machine 145 moves (along the provided route(s) or outside of the provided route(s)). According to one or more embodiments, the routing guidance can be provided on the display 148 in the context of a map, for instance, a road map, with road-related features associated with the surrounding area associated with the routing guidance (e.g., roads, landmarks, commercial establishments, road signs, worksite system(s) 150, other ground material moving machines 145, navigational headings, hazards, etc.). One or more machine sensor(s) 146 of the ground material moving machine 145 can provide location information for the ground material moving machine 145. Examples of such machine sensor(s) 146 include an inertial navigation unit (INU), an inertial measurement unit (IMU), a global positioning system (GPS) unit, a global navigation satellite system (GNSS) unit, etc.

In this particular example, the routing guidance shows a desired route for the ground material moving machine 145 (which may also be shown on the display 148) to go from its current location (e.g., at a location or facility of the working machine system 140) to a worksite system 150(1). The routing guidance can also show a desired route for the ground material moving machine 145 to from the worksite system 150(2) to a worksite system 150(2). Worksite system 150(1) may be a paving material loading worksite to load the ground material moving machine 145 with paving material (e.g., heated paving material), and worksite system 150(2) may be a dumpsite for the paving material. Thus, the routing guidance can provide desired routes for the ground material moving machine 145 to satisfactorily perform each of the job-specific tasks, i.e., reaching the worksite system 150(1) to receive the paving material and reaching the worksite 150(2) to provide the paving material to the worksite 150(2).

In the specific example of heated paving material, the provided route to the worksite system 150(1) can ensure that the ground material moving machine 145 is at the worksite system 150(1) such that the heated paving material can be loaded in the ground material moving machine 145 at a sufficiently high temperature, for instance, within a predetermined time or time window from generating the heated paving material at the worksite system 150(1). Likewise, the provided route from the worksite 150(1) to worksite system 150(2) can ensure that the ground material moving machine 145 arrives at the worksite system 150(2) at a specific time or time window such that the heated paving material is still sufficiently hot to be provided for paving operations at the worksite system 150(2). Optionally, the provided route from worksite system 150(1) to worksite system 150(2) may be updated or provided only upon the ground material moving machine 145 reaching the worksite 150(1) and being identified as ready to perform the second part of the work project.

The ground material moving machines 145 can perform the assigned jobs or tasks of the work project. The actual performance of the ground material moving machines 145 can be compared against the routing guidance provided to the ground material moving machines 145. For instance, the project management system 110 can receive actual route information from the working machine system 140 either directly from the ground material moving machines 145, via the fleet management system 142, or via the back office system 130, and compare the actual route information to the routing guidance information provided to the ground material moving machine 145. Based on the comparison, the work project management system 110 can determine route deviation of the ground material moving machine 145 relative to the provided routing guidance information. As noted above, such route deviation can be in terms of physical route, route timing (i.e., actual time versus estimated time), and/or some other aspect of the routing guidance information. According to one or more embodiments, the route deviation may be characterized as route guidance information compliance, and may be satisfied completely (i.e., no route deviation), in the case of ground material moving machines 145 satisfying the requirements of the routing guidance information.

The work project management system 110 can characterize the routing guidance information deviation or compliance according to a score, for instance, a compliance score. As an example, the work project management system 110 can characterize compliance with the routing guidance information for each of the ground material moving machines 145 according to a percentage of compliance (e.g., a range of 0 to 100%). According to FIG. 3, for instance, which shows an example of a work project management interface 115 that can be generated by the work project management system 110, the work project management interface 115 can provide one or more compliance scores 116 for the various ground material moving machines 145 for a particular work project or projects. Optionally, the work project management system 110 may also determine or otherwise provide, via the work project management interface 115, compliance scores for one or more of the worksite systems 150 (e.g., the top compliance score).

Figure 3:
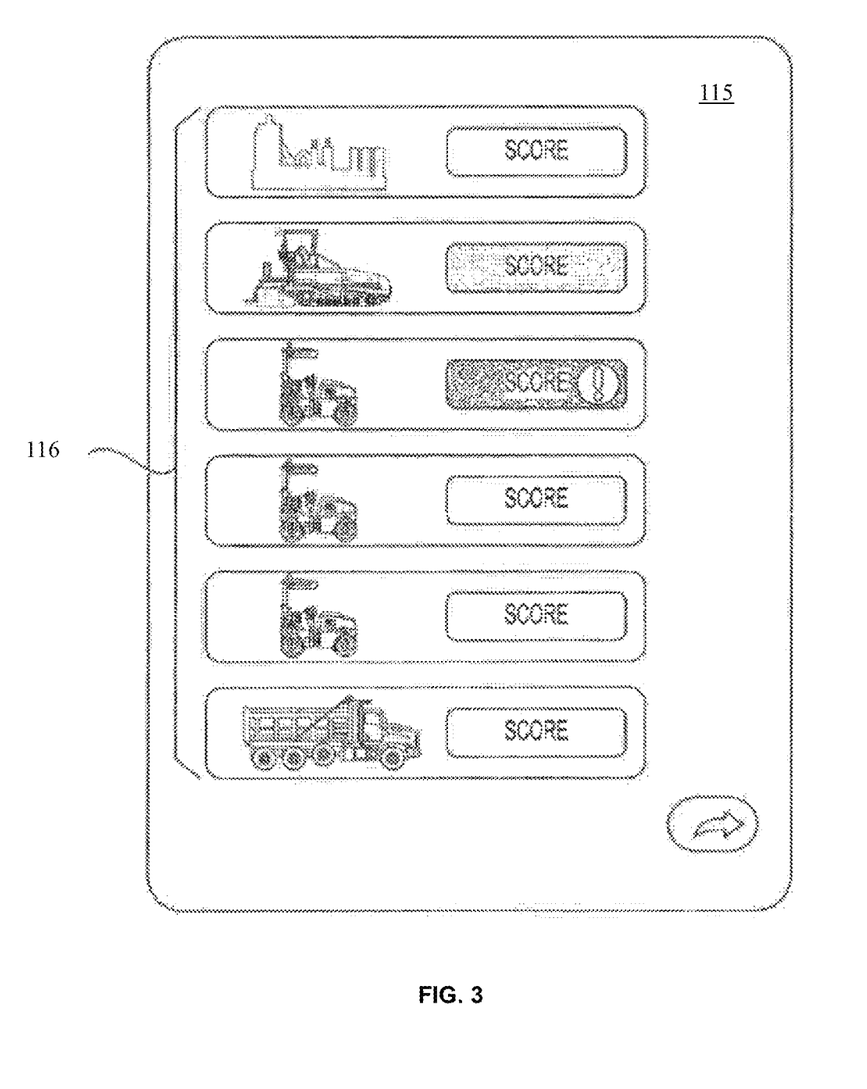
FIG. 3 is an example of a project management interface of a work project management system according to one or more embodiments of the disclosed subject matter.

According to one or more embodiments, the characterization of the routing guidance information can be in terms of multiple passes of a same route or routes by the same ground material moving machine 145 or passes by some or all ground material moving machines 145 performing the same jobs or tasks, for instance.

The work project management system 110 can provide feedback regarding route guidance information deviation or compliance to the working machine system 140, for instance, via the network 160. For instance, the work project management system 110 can electrically output the compliance score for each of the ground material moving machines 145 to the fleet management system 142 of the working machine system 140. Optionally, specific information regarding the deviation or compliance can be provided, such as additional mileage due to the deviation, additional time due to the deviation, or specific non-compliance with other aspects of the route guidance information, such as overspeed, underspeed, dangerous driving, etc.

According to one or more embodiments, the work project management system 110 can adjust the determined deviation or compliance assessment based on environmental factors that may be out of the operator's control. For instance, due to an unforeseen traffic jam the operator may be delayed and/or have to reroute from the initial route guidance information. In this case, the work project management system 110 can determine an adjusted or scaled deviation or compliance score determination. According to one or more embodiments, the adjustment may be characterized as adjusted or modifying an operating point or points of the ground material moving machine 145.

The fleet management system 142 can share the deviation or compliance information with the operator of the ground material moving machine 145 to training or payment (compensation or pay item) purposes. For instance, in a case where the operator deviated or had a compliance value below a certain threshold, the entity associated with the fleet management system 142 may not be compensated in full by the entity associated with the work project management system 110. Hence, the entity of the fleet management system 142 may decide to modify compensation for the operator of the ground material moving machine 145.

Figure 4:
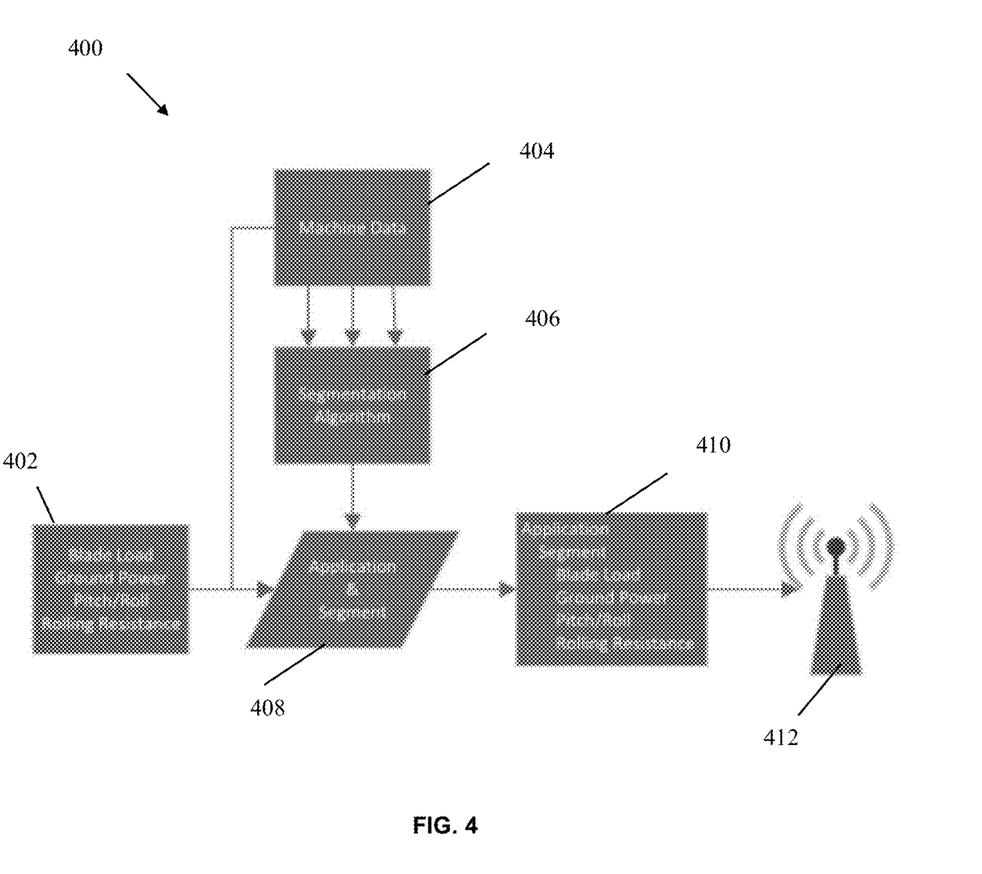
FIG. 4 is a block diagram of a characterization system and/or method according to one or more embodiments of the disclosed subject matter.

Turning to FIG. 4, FIG. 4 is a block diagram of a characterization system 400 and/or method according to one or more embodiments of the disclosed subject matter. Characterization system 400 can be running in real time as a ground material moving machine, such as ground moving material machine 145 discussed above, operates at a worksite. In this context, the ground material moving machine 145 may be operating at a worksite, such as worksite system 150, or between worksite systems 150. Moreover, the processing for system 400 can be performed onboard the ground material moving machine 145, for instance, via one or more processors or processing circuitry of the ground material moving machine 145.

Regarding system 400, machine data can be acquired, in real time, via one or more sensor(s) 146 of the ground material moving machine 145, using machine data module 404. Such machine data may be characterized as so-called traditional machine data, for instance, hard coded data regarding specific operating parameters of the ground material moving machine 145 (e.g., where the drive train is operating, position of implement, etc.). System 400 can also acquire, in real time, ground surface-related machine data, such as pitch/roll, ground power, rolling resistance, load (e.g., blade load), etc., via ground surface data module 402.

The machine data can be provided to a segmentation module 406, which may implement one or more segmentation algorithms. The segmentation module 406 can determine segments based on the traditional machine data, such as where the ground material moving machine 145 is driving, where the ground material moving machine 145 is using an implement, such as a dump bed or a blade, and particular operations or functions performed by the ground material moving machine 145, such as final grading, heavy dozing, ripping, etc.

The output(s) from the segmentation module 406, the output(s) from the machine data module 404, and particularly the output(s) of the ground surface data module 420, which notably can include one or more external parameters associated with operation of the ground material moving machine 145, can be provided to an application and segment module 408. Generally, the application and segment module 408 can, based on the foregoing inputs, identify application and corresponding segments for each application. That is, the segments can be identified based on the machine data from the machine data module 404, the identified segments can be merged together, for instance, in a linear manner, and characterized under a particular application. The output of the application and segmentation module 408 can be received by and stored in a characterization module 410, which can store a plurality of machine functions according to application and specific segments.

The characterizations of the characterization module 410 can be offloaded from the ground material moving machine 145 via communication module 412 of the ground material moving machine 145. According to one or more embodiments, such offloading can be to the fleet management system, the back office system 130, and/or the work project management system 110.

INDUSTRIAL APPLICABILITY

As noted above, the present disclosure relates to electronically assessing operator performance when operating a working vehicle adapted to handle or process ground material, such as a haul truck, a loader, a tractor (e.g., bulldozer), a vibratory compactor, etc.

Generally, one or more embodiments of the disclosed subject matter can provide systems (including portions thereof) and methods that can identify route deviation (and/or compliance) relative to actual jobs or tasks performed by ground material moving machines, such as ground material moving machines 145. For instance, a vehicle routing system can provide the route and duration to ground material moving machines operators to take a desired path (e.g., the shortest path) to a destination. Further, this information may be used to compare the time what they took to haul versus the time predicted in the vehicle routing system, and then a paying entity can define the compensation based on actual productive hauling hours.

Embodiments of the disclosed subject matter can also uniquely characterize machine functions based on particular external factors, particularly, composition of underfoot (e.g., composition of work surface, location, orientation, etc.) and/or the respective work cycle task (e.g., segment) being performed by the ground material moving machine. Based on such characterization machine performance can be accurately diagnosed, for instance, to identify areas where efficiency improvement can be implemented.

For example, embodiments of the disclosed subject matter can implement systems and methods that can collect unique metrics indicative of machine performance (e.g., blade load, ground power, pitch & roll data, etc.) and work surface material composition. This can enable a comparison of operating points in each segment to targets and/or to historical data, to more readily identify the need for efficiency improvements, training, machine maintenance, etc. Such systems and methods can collect information in real time, correlate the information (e.g., blade load, ground power, pitch & roll data) to the particular segment of the work cycle (e.g., dig/haul/dump) being performed, and generate a unique user interface ("UI") to report the information. This can provide machine segmentation using new metrics.

According to embodiments of the disclosed subject matter, put another way, the system 400 can analyze data on machine data channels (e.g., implement is at this position, bed is at this position, wheels turning at this rate, etc.) and we look at all of these independent data channels to figure out what action or task the ground material moving machine 145 is trying to accomplish from this machine-based data. In addition to this data, particularly because such machine data may change based on external factors (e.g., if machine running concrete versus loose underfoot, muddy terrain, side of mountain, etc., so that effort may be completely different), which may otherwise make characterization difficult, the additional machine data based on external factors are also taken into consideration, such as blade loading, and in light of historical data for the ground material moving machine 145 relative to the additional machine data.

For example, the system 400 can receive real time data as the ground material moving machine 145 operates and can identify that at a same location, for instance, we were once operating in a certain way, but now the machine data indicates that the ground material moving machine 145 is operating differently. This difference in operation can be attributed to an external force on the ground material moving machine 145, for instance, a work-surface related external force. Examples of external factors that may affect operation of the ground material moving machine 145 can be whether the ground material moving machine 145 is carrying a load or otherwise acting on a load (e.g., blade loaded due to material in front of blade).

Hence, the external force(s) may lend to identification of one or more operating points of the ground material moving machine 145, and a corresponding change of the operating point(s) in light of the external force, where a change (or need to change) in the operating point(s) may otherwise not be identified absent acquiring machine data pertaining to the external force(s). In this regard, embodiments of the disclosed subject matter can not only characterize the underfoot of the ground material moving machine 145, but can also use the characterization to modify one or more operating point(s) of the ground material moving machine. Moreover, based on the modified one or more operating point(s), the system 400 can adjust corresponding operating parameters of the ground material moving machine 145 down by the particular amount.

As an example, the system 400 may characterize the underfoot of the ground material moving machine 145 and, based on such characterization identify that the ground material moving machine 145 as being capable of operating at 60% machine power (for the particular underfoot conditions), and adjusts associated operating parameters based on the reduced capability. In this regard, inefficiency may be properly assessed in terms of the actual operating capabilities for the particular underfoot conditions, rather than operating parameters without factoring in the characterization of the external factors related to the underfoot of the ground material moving machine 145.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system for managing work projects for haul trucks comprising:

a work project management module of a first entity, including memory and processing circuitry, configured to receive and process work project information for a work project to be performed by one or more haul trucks of a second entity different from the first entity, the work project information including worksite data regarding one or more worksites associated with the work project, haul truck data regarding the one or more haul trucks, and operator data regarding one or more operators for the one or more haul trucks; and a routing module of a third entity different from the first and second entities, which is accessible by the second entity, configured to receive the work project information from the work project module, determine job-specific route information for the work project for each of the one or more haul trucks based on the work project information, and provide the determined job-specific route information in the context of a map to each of the one or more haul trucks for display on a display device in the haul truck, wherein the work project management module is configured to, for each of the one or more haul trucks, receive actual route information regarding an actual route taken for the work project by the haul truck, compare the actual route information to the job-specific route information, and determine route deviation, if any, regarding the comparison, wherein the work project management module is configured to electronically output feedback to the second entity regarding the determined route deviation, wherein the feedback electronically output by the work project management module includes compliance information for each of the one or more haul trucks pertaining to the route deviation for the work project, wherein the compliance information includes a scaled compliance score based on an adjusted operating point of the one or more haul trucks, the adjustment of the operating point being a reduction of the operating point based on the collected road surface-related information, and wherein the scaled compliance score is within compliance even with the route deviation for the work project and the reduction of the operating point.

2. The system according to claim 1, wherein the determined route deviation includes deviation in terms of actual time versus estimated time to complete a job-specific route of the job-specific route information and/or in terms of actual path compared to path of the job-specific route of the job-specific route information.

3. The system according to claim 1, wherein the haul truck data includes data regarding capacity, height, and/or width of the one or more haul trucks, and the of the job-specific route information is determined for each of the one or more haul trucks based on the capacity, height, and/or width of the haul truck.

4. The system according to claim 1, wherein the job-specific route information includes a shortest path for the haul truck in terms of time and/or distance to reach a final destination for the work project.

5. The system according to claim 1, further comprising a back office telematics module of a fourth entity different from the first, second, and third entities, having memory and processing circuitry, the back office telematics module being configured to provide at least the worksite data of the work project information to the work project management module.

6. The system according to claim 1,
wherein a job-specific route of the job-specific route information includes multiple segments, including a first segment for the haul truck to arrive at a loading site and a second segment for the haul truck for leaving the loading site with hauling material, and
wherein the job-specific route is provided or updated at least at a beginning of each of the multiple segments.

7. The system according to claim 1,
wherein a job-specific route of the job-specific route information includes multiple segments, including a first segment for the haul truck to arrive at a loading site and a second segment for the haul truck to arrive at a dump site after being loaded at the loading site, and
wherein the job-specific route indicates, as part of the second segment, a time or time window at which the haul truck must arrive at the loading site in order to be loaded with hauling material to ensure the hauling material is provided to the dump site within a predetermined amount of time based on characteristics of the hauling material, a time at which the hauling material is expected to be ready for loading, and/or operations to be performed at the dump site that require the hauling material.

8. The system according to claim 1, wherein the scaled compliance score is based on the adjusted operating point of the one or more haul trucks determined by the one or more haul trucks collecting road surface-related information in real time and a back office telematics module correlating the collected road surface-related information to a segment of a job-specific route of the job-specific route information.

9. A method for electronically assessing operator performance when operating ground material moving machines, the method comprising:
providing, to a routing module, work project information for a work project, the work project information including at least worksite data regarding one or more worksites associated with the work project and ground material moving machine data regarding one or more ground material moving machines identified to perform the work project;
determining, using a work project management module, for each of the one or more ground material moving machines, route deviation for the work project based on comparison of actual route information regarding an actual route taken by the ground material moving machine with instructed route information for the work project produced by the routing module prior to commencement of the actual route taken by the ground material moving machine; and
electronically outputting, by the work project management module, feedback regarding the determined route deviation,
wherein the feedback regarding the determined route deviation for said electronically outputting includes compliance information for each of the one or more ground material moving machines pertaining to the determined route deviation,
wherein the compliance information includes a scaled compliance score based on an adjusted operating point of the one or more ground material moving machines determined by the one or more ground material moving machines collecting road surface-related information in real time,
wherein the adjustment of the operating point is a reduction of the operating point based on the collected road surface-related information, and
wherein the scaled compliance score is within compliance even with the route deviation for the work project and the reduction of the operating point.

10. The method according to claim 9, wherein the determined route deviation includes deviation in terms of actual time versus estimated time to complete a job-specific route of the instructed route information and/or in terms of actual path compared to path of the job-specific route of the instructed route information.

11. The method according to claim 9, wherein the ground material moving machine data includes data regarding capacity, height, and/or width of the one or more ground material moving machines, and the instructed route information is determined for each of the ground material moving machines based on the capacity, height, and/or width of the ground moving machine.

12. The method according to claim 9, wherein the instructed route information includes a shortest path for the ground material moving machine in terms of tune and/or distance to reach a final destination for the work project.

13. The method according to claim 9,
wherein the method further includes correlating, by a back office telematics system, the collected road surface-related information to a segment of a job-specific route of the instructed route information.

14. A non-transitory computer-readable storage medium storing computer-readable instructions that, when executed by one or more computers, cause the one or more computers to perform a method comprising:
acquiring, in real time, machine data from one or more machine sensors of a ground material moving machine at a worksite;
acquiring, in real time, ground surface operational parameters of the ground material moving machine at the worksite;
comparing the acquired machine data and ground surface operational parameters with historical data regarding operation of the ground material moving machine at the worksite, said comparing resulting in an indication of a work deviation for the ground material moving machine;
dynamically changing an operating point for the ground material moving machine to less than a maximum operating point based on said comparing resulting in the indication of the work deviation by the ground moving machine;

characterizing one or more functions of the ground material moving machine based on the changed operating point for the ground material moving machine; and electronically outputting feedback based on said comparing the acquired machine data and ground surface operational parameters with historical data, wherein the feedback for said electronically outputting includes compliance information of the ground material moving machine pertaining to the work deviation, and wherein the compliance information indicates compliance even with the work deviation and the changing of the operating point to less than the maximum operating point.

15. The non-transitory computer-readable storage medium according to claim 14, wherein the characterization includes tying the changed operating point to a segment of a corresponding application.

16. The non-transitory computer-readable storage medium according to claim 14, wherein the method is performed in real time as the ground material moving machine travels under guidance from route guidance information, and the changed operating point is factored in to a post-route compliance score for operation of the ground material moving machine relative to the route guidance information.

* * * * *